June 6, 1950

C. E. POER 2,510,479

OPTICAL GAUGE

Filed Feb. 15, 1946

CHARLES E. POER,
INVENTOR.

BY

ATTORNEY.

Patented June 6, 1950

2,510,479

UNITED STATES PATENT OFFICE 2,510,479

OPTICAL GAUGE

Charles E. Poer, Los Angeles, Calif., assignor, by mesne assignments, to R. A. Jacobus, Covina, Calif.

Application February 15, 1946, Serial No. 647,844

6 Claims. (Cl. 88—39)

This invention relates generally to gauges and measuring instruments, and more particularly to such instruments adapted for use in machine shop practice for the purpose of centering, laying out, or locating work pieces with reference to rotational axes. Devices embodying the present invention have many uses outside the field of machine shop practice, and the particular applications hereinafter instanced are therefore to be regarded merely as typical and not as implying any limitation on the field of use of the invention.

The present invention pertains to the subject matter of the United States Patent 2,366,430, issued January 2, 1945, to Donald Lacy Benton of Los Angeles, California, and is in the nature of an improvement on the device described and claimed therein.

The accurate location of work pieces in machine tools for the purpose of performing cutting or grinding operations thereon normally constitutes two separate steps. First it is necessary to accurately establish the axis of operational rotation, that is, the axis of rotation of a drill, boring bar, or cutter held in a drill press, boring mill, or milling machine; or the axis of rotation of the work held in lathes, boring mills, and the like. The second step in accurately locating the work piece concerns itself with the relative location of the work, and the aforementioned axis of rotation. To facilitate the latter step, it is the usual practice to place reference marks on the work piece, and to compare these reference marks with an index member, such as a pointer, temporarily held in the chuck, or other tool holder of the machine tool involved. It will be readily seen that the practice just described is open to at least two prolific sources of error. First, the index member above mentioned may fail to lie on the axis of rotation, and secondly, parallax and other human errors may cause the reference marks on the work piece to be inaccurately aligned with the index member. It is well known that many modern machining operations necessitate working to tolerances of the order of ten-thousandths of an inch, and accordingly, it is necessary to provide work locating means capable of accurately determining the position of work pieces to a degree of accuracy well within such tolerances.

It is a primary object of my invention to provide a work locating instrument adapted to be held in chucks or other tool holding members of machine tools, which incorporates an index so mounted in the instrument that it may be adjustably moved into alignment with the rotational axis of the machine tool in which the instrument is held.

It is another object of my invention to provide an optical viewing system for observing the position of the aforesaid index relative to reference marks placed on the work piece involved, which optical system is adapted to substantially avoid the effects of parallax and to provide magnification of the aforesaid index and reference marks.

It is still another object of my invention to provide an instrument as described which may be observed from two diametrically opposed points of view, thus making possible use of the half-error correction system, such as is frequently used in the precise adjustment of surveying and other instruments.

It is a further object of my invention to provide an instrument as described which includes means for concentrating light on the index and reference lines under observation.

It is a still further object of my invention to provide such an instrument which is simple, rugged, easy to manufacture and use, and well adapted to withstand the rough usage often encountered in machine shops.

The foregoing and other objects and advantages of my invention will appear from the following description and attached drawings. Briefly described, the device embodying my invention employs an optical reticle having engraved thereon as an index, a fine line or "cross hair." The instrument is provided with a cylindrical shank thus adapting it to be held in a conventional Jacobs chuck, or other tool holding device. Means are provided within the instrument to swing the index into alignment with the rotational axis of the machine tool in which the instrument is held. The reticle is observed through an optical system which includes a magnifying lens and a reflecting prism, the purpose of these elements being to magnify the image of the "cross hair" and to bring the line of sight substantially parallel to the above mentioned axis of rotation, thus avoiding parallax.

For a more detailed description of the present embodiment of my invention, reference should now be had to the attached drawings, in which.

Figure 1:
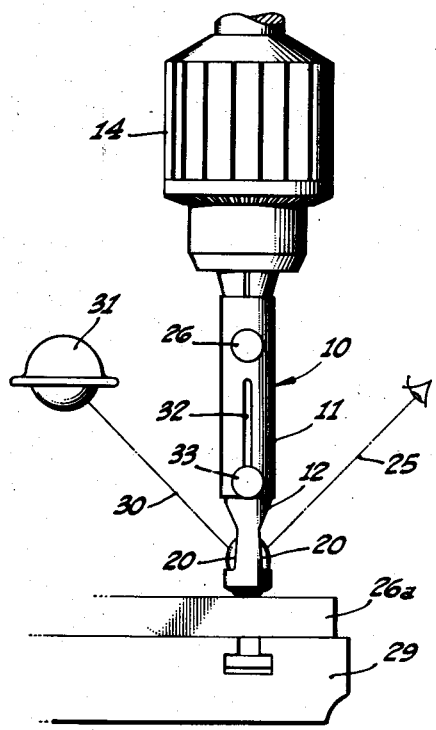
Fig. 1 is an elevational view of the work locating instrument clamped in a conventional machine tool.

Referring now to Fig. 1, the numeral 10 indicates generally an instrument constructed according to my invention. A cylindrical tube 11 forms the main body of the instrument, and has slidably mounted at its lower end a draw-tube 12 carrying the optical system; and tiltably mounted in its upper end a cylindrical shank 13 adapted to be held in a tool holding clamp of conventional design, as for example, the Jacobs chuck 14, shown in Fig. 1. The optical system employed in the device is bilaterally symmetrical about the vertical axis of the instrument, and comprises a wedge-shaped prism 15 and a pair of plano-convex lenses 16 and 17. The lenses 16 and 17 employed in the instrument illustrated have a focal length on the order of 30 mm. which I have found to provide an optimum degree of magnification and light concentration.

Figure 3:
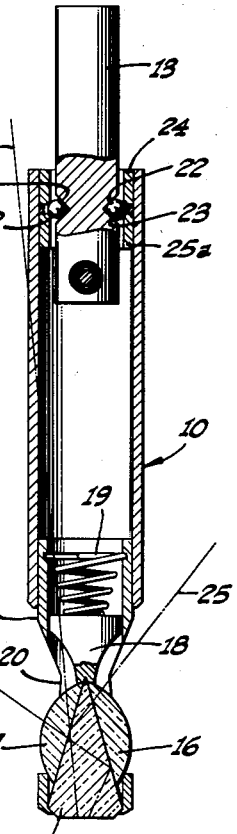
Fig. 3 is an elevational and partially sectioned view of the device taken along the line 3—3 in Fig. 2.

As will be seen from an examination of Fig. 3, the cross section of the prism 15 is in the shape of an isosceles triangle, having a relatively acute apex angle. In the present embodiment the prism 15 is constructed of flint glass and has an included apex angle on the order of 30°. The vertical sides of the prism 15 are cylindrically formed, thus making the base circular, and adapting the prism to be received inside the draw tube 12. The lower edge of the draw tube 12 is rolled inwardly, forming an annular constriction against which the prism 15 rests. In order to prevent chipping of the prism 15 where it rests against the constriction in the draw tube 12, the lower edge is chamfered, as can be seen in Fig. 3.

Figure 2:
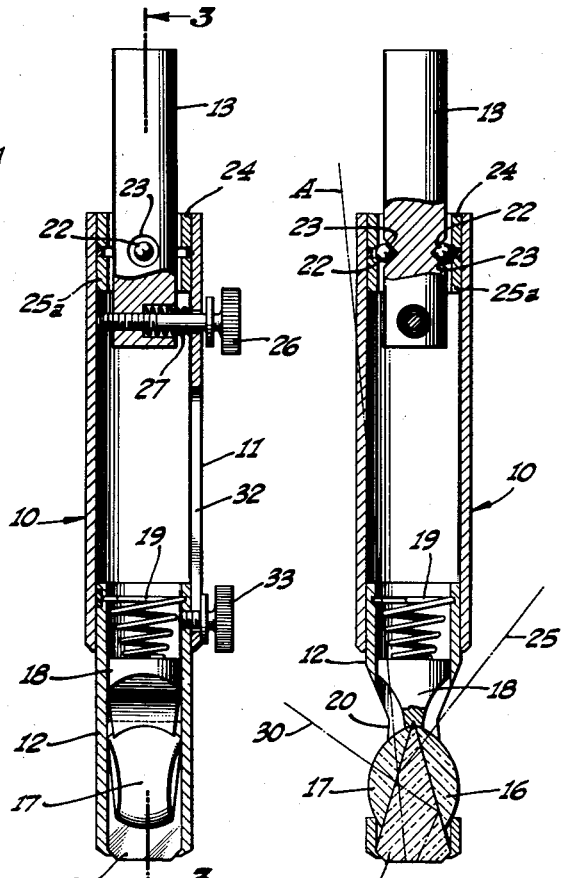
Fig. 2 is an elevational, partially sectioned view of the instrument taken along the line 2—2 in Fig. 1.

The two lenses 16 and 17 are mounted with their plane surfaces resting against the inclined surfaces of the prism 15 and are held in this position by a downwardly thrusting plunger 18, which thrusts against the convex surfaces of the lenses 16 and 17 near their upper edges, as can be seen best in Figs. 2 and 3. It will be seen from an examination of Fig. 3 that the downward pressure of the plunger 18 occasioned by the thrust of a conical spring 19 pressed against the upper end thereof and anchored in the draw tube 12, urges the lenses 16 and 17 to slide downwardly along the inclined faces of the prism 15, and hence outwardly with respect to the vertical axis of the instrument. The outward thrust of the lenses 16 and 17 just described is made use of to hold them in place by forming them into a wedge-shape as can be seen in Fig. 2. By virtue of this wedge shape, the outward thrust of the lenses 16 and 17 forces them to seat securely against the vertical edges 20 of a pair of openings formed in the walls of the draw tube 12. The downward thrust of the plunger 18 also forces the prism 15 to seat itself securely against the annular constriction in the lower end of the draw tube 12. Thus it will be seen that the mounting provided assures intimate contact of the lenses 16 and 17 with the prism 15, holds all the optical elements in proper relative position, and provides shock absorbing means to prevent damage of the optical elements, such as might be occasioned by striking the lower surface of the prism 15 on metal or other hard surfaces.

Figure 4:
Fig. 4 is a view of the reticle employed in my device as viewed through the optical system thereof.

The index 21 of the instrument is in the form of an interrupted cross line engraved in the lower surface of the prism 15. The appearance of the index line 21 as viewed either from the bottom of the instrument, or through the optical system, as will be later described, is seen best in Fig. 4. This position of the index line 21 on the base of the prism 15 is such as to lie perpendicular to the plane of the drawing in Fig. 2 and parallel thereto in Fig. 3.

As has been previously mentioned, it is desirable that means be provided within the instrument for moving the index line 21 to a position where it intersects the rotational axis of the machine tool in which the instrument is held. To this end, the supporting shank 13 is tiltably mounted in the body tube 11 by means of a pair of pivot balls 22. The pivot balls 22 rest in a pair of diametrically opposed sockets 23 formed in the cylindrical surface of the shank 13. The balls 22 also rest in an annular groove formed by the edges of a pair of rings 24 and 25a, which are pressed into the upper end of the body tube 11. Thus it will be seen that the shank 13 is adapted to tilt laterally about an axis defined by the opposed sockets 23. As a means for adjusting the shank 13 to any position along the line of tilting motion just described, a knurled adjustment screw 26 is threadedly engaged with the lower end of the shank 13.

As can be seen in Fig. 2, the screw 26 thrusts against the inner wall of the body tube 11 and extends through a clearance hole in said wall to a position for convenient manual adjustment. Opposing the thrust of the screw 26 is a compression spring 27 which thrusts at one end against the lower end of the shank 13, and at the other end against the inner wall of the body tube 11. Thus it will be seen that the shank 13 is relatively rigidly held in any position to which it is adjusted by means of the screw 26. When the shank 13 is rigidly held in a tool clamping device, as for example the Jacobs chuck 14, as shown in Fig. 1, then adjustment of the screw 26 serves to swing the entire instrument laterally about the line defined by the opposed sockets 23 in the shank 13. Thus, by manipulation of the screw 26, the index line 21 can be brought to a point where it intersects the axis of rotation of the chuck 14.

In the operation of my device, the index line 21 is observed through the optical system, the line of sight of such observation being indicated generally by the line 25 in Fig. 1 and Fig. 3. From an examination of the optical path shown in Fig. 3, it will be seen that this path 25 passes through the lens 16, is reflected from an inclined surface of the prism 15, and thence passes downwardly to the base of the prism, wherein is engraved the index line 21. As is well known in the optical art, even finely polished glass surfaces reflect light internally when placed in face-to-face physical contact. This internal reflection occurs because of the presence of a minute layer of air between the surfaces which is unavoidable even when the surfaces approach "optical flatness." Thus, an internal reflection occurs in the prism 15 in spite of the presence of the lens 16 or 17 against the outside of the reflecting surface. Also, it should be noted, that an internal reflection will occur whenever the angle of a light ray is greater than the critical angle of emergence, regardless of the relative indices of refraction of the lens and prism. As is indicated in Fig. 1, the instrument 10 is so mounted relative to the work piece 26a that the surface of said work piece falls immediately below the base of prism 15, and is hence visible as a background to the index line 21. As has been previously stated, a pair of crossed reference lines 28 and 29 are placed on the surface of the work piece, their point of intersection being the point of reference which it is desired to align with the axis of rotation of the machine tool. The general appearance of such reference lines as viewed through the optical system is indicated in Figs. 5 to 8 inclusive. It is to be noted that the interruptions in the index line facilitate the accurate alignment of the reference lines therewith.

Figure 5:
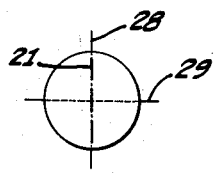
Figs. 5 through 8 inclusive, are diagrammatic representations of the field of view of the device illustrating various steps of a work locating operation.
Figures 6, 7, 8:
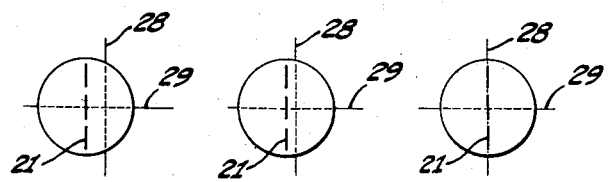

The first step necessary in accurately centering the work piece 26a with the axis of rotation is that of bringing the index line 21 into alignment with said axis. The successive steps of this index adjustment are illustrated by Figs. 5, 6 and 7, respectively, and are performed as follows. While observing the superimposed images of the index and reference lines as hereinbefore stated, the work table 29 is moved to bring one of the reference lines 28 into exact alignment with the index 21, as is indicated in Fig. 5, the chuck 14 being manually rotated if necessary. The chuck 14 and the instrument 10 held thereby are now rotated through 180° and the index 21 is observed through the lens 17, i. e., the lens opposite to that through which the initial observation was made. It will be readily seen and appreciated that the bi-lateral symmetry of the optical system makes possible observation of the index line 21 through either of the lenses 16 or 17, hence obviating the necessity of the observer changing his point of view. When the instrument 10 has been rotated through 180°, as just described, and, if, as is probable, the index line is not already aligned with the axis of rotation, the reticle, as observed through the optical system, will have the appearance shown in Fig. 6, wherein it will be seen that the index line 21 is displaced horizontally from the reference line 28. A half-error correction is now applied by the manipulation of the adjustment screw 26, as previously described, reducing by one-half the displacement of index line 21 and reference line 28, the field of view after this correction being indicated in Fig. 7. One correction operation, as just described, is usually sufficient to bring the index line 21 into alignment with the axis of rotation. Having adjusted the position of the index, table 29 is again moved to bring the reference line 28 into alignment with the index line 21. If the half-error correction has been properly estimated, the index line 21 will still be aligned with the reference line 28 after a second rotation of the instrument 10 through 180°. If the second rotation of the instrument again displaces the index line 21 and the reference line 28, another half-error correction is applied in the manner just described.

Having accurately aligned the index line with the axis of rotation, and having moved the work table to bring the vertical reference line 28 into alignment with said axis, the instrument may now be rotated through 90°, the index observed through either of the lenses 16 or 17, and the work table moved to bring the horizontal reference line 29 into alignment with the index 21. It will be readily appreciated by those skilled in the art of machine shop practice that the instrument is capable of easily and accurately locating work pieces by the method just described.

One of the major difficulties encountered in the use of optical instruments for the location of work pieces lies in the fact that it is often difficult or impossible to adequately illuminate the reference lines under observation. It will be seen from an examination of Figs. 1 and 3 that the bi-lateral symmetry of the optical system provides adequate illumination at all times, since light striking either of the lenses 16 or 17 passes into the prism, is reflected from the opposite inner face and directed downwardly onto the work. By way of example, a ray 30 emanating from a light source 31 and entering the optical system is shown in Fig. 1. The path of this ray through the optical system is further illustrated in Fig. 3 where it can be seen that it passes through the lens 17 into the prism 15 and reflects from the opposed inner face passing downward and out through the base of the prism 15.

The inner face reflection just described also applies to the optical axis of observation, that is, the line of sight 25, shown in Fig. 1. In Fig. 3, the optical axis has been extended through the reflecting surface in accordance with well-known optical principles thus illustrating that the appearance of the reticle as viewed through the lens 16 is the same as that which would be observed from an imaginary station point located at A in Fig. 3. Thus it will be seen that since the direction from which the reticle is observed lies substantially parallel to the axis of the instrument 10, the error of parallax is relatively small.

In order that the optical system may be protected against damage when the instrument is not in use, provision is made to retract the draw tube 12 and the optical elements mounted therein into the body tube 11. Such provision is made in the form of a slot 32 in the body tube 11 through which passes a clamping screw 33 threadedly engaged with the draw tube 12. Ample clearance is provided in the slot 32 to permit the clamping screw 33 to be loosened and the draw tube 12 to be retracted into the body tube 11, the screw 33 then being retightened to retain the draw tube 12 in its retracted position. Additional protection may be provided in the form of a dust cap (not shown) placed over the lower end of the body tube after the retraction of the draw tube.

An additional advantage achieved through the use of the draw tube construction just described is that the instrument may be secured in the chuck, as indicated in Fig. 1, at approximately the desired distance above the work and a final adjustment of the optical system relative to the work surface made by operation of the draw tube. To facilitate this type of fine adjustment, a thin plastic shim may be employed whose thickness is equal to the minimum distance of the reticle from the working surface which will permit rotation of the instrument without scratching the reticle surface. The shim is placed on the working surface under the reticle and the draw tube lowered into contact therewith, at which point the screw 33 is then tightened and the shim removed.

While the operation of centering a pair of crossed reference lines has been used herein to illustrate one possible use of the instrument, it is well adapted to many other uses. For example, by the provision of plugs with suitable reference marks placed thereon, cylindrical holes in work pieces or drill jigs may be accurately aligned with the spindles of drills and other machine tools. Devices embodying my invention also find wide use in such machine shop operations as inspection of machined parts, measurement of such parts, duplication of hole patterns, and the accurate replacement of partially machined work in machine tools.

While the apparatus shown and described herein is fully capable of attaining the objects and providing the advantages hereinbefore stated, it is to be understood that it is merely illustrative of the presently preferred embodiment of my invention, and that I do not mean to limit myself to the details of construction or design herein shown, other than as defined in the appended claims.

I claim:

1. An instrument for observing the position of a work piece relative to a rotary axis which includes an optical system comprising in combination: an optical prism of isosceles triangular cross section having a pair of substantially identical surfaces diametrically opposed and symmetrically disposed about said rotary axis at an acute angle to one another, having a third surface normally disposed to said rotary axis, and having an index formed in said third surface; and a pair of substantially identical plano-convex lenses, each disposed with its plane surface in substantial contact with one of said pair of prism surfaces, whereby said index may be selectively observed by reflection from an inner face of said prism along either of two lines of sight oblique to, and diametrically opposed about said rotary axis.

2. In an optical gauge, the combination of: a shank; an optical reticle having an index line formed therein; longitudinally disposed supporting means articulately mounted at its inner end to said shank and adapted to support said reticle adjacent an outer end of said supporting means in a plane substantially normal to the axis of said shank; adjusting means operatively associated with said shank and supporting means whereby to move said reticle transversely of said shank axis, and in a direction normal to said index line; and transparent means mounted in said support having a pair of surfaces therein disposed at an acute angle to each other, disposed at substantially equal angles to said axis, and adapted to reflect rays striking the same at greater than a critical angle thereto and to transmit rays striking the same at less than said critical angle, said surfaces being disposed inwardly of said reticle whereby to reflect an image of said reticle so that said image is visible along an oblique line of sight through the other of said surfaces.

3. The structure defined in claim 2 further characterized by having magnifying means mounted in said supporting means adjacent at least one of said surfaces and transversely disposed to said oblique line of sight whereby to magnify said reflected image of the reticle.

4. The structure defined in claim 2 further characterized by having light condensing means mounted in said support and adapted to condense ambient light and direct the same through one of said surfaces against the other thereof whereby to reflect said light downwardly to illuminate the area closely adjacent said reticle.

5. In an optical gauge for adjusting work in a power tool to locate a given point in a relatively fixed member in relation to the axis of a rotatable member in said tool: a shank adapted to be secured to said rotatable member; a housing extending longitudinally from said shank, said housing having a pair of diametrically opposed lateral openings therein; bearing means connected between said shank and housing whereby to permit swinging motion of said housing about an axis adjacent an inner end of said housing and transverse to said rotary axis; means to adjustably move said housing in said swinging motion; and an optical prism having a base substantially normal to said rotary axis and a pair of inclined faces disposed at substantially equal angles to said base mutually intersecting at an acute apex angle along a line of intersection substantially transverse to said rotary axis, said prism being mounted in said housing with said base adjacent the outer end thereof and with said inclined faces each underlying one of said openings, said base having an index line formed therein substantially parallel to said transverse axis whereby said adjustment serves to swing said index line laterally to intersect said rotary axis and whereby the image of said line reflected internally from one of said inclined faces may be viewed through the other thereof and through one of said openings.

6. The construction set forth in claim 5 further characterized by having a pair of positive lenses, one mounted in each of said lateral openings whereby to magnify said reflected image and whereby to concentrate ambient light entering said prism through said openings.

CHARLES E. POER.

REFERENCES CITED

The following references are of record in the file of this patent:

UNITED STATES PATENTS

| Number | Name | Date |
|---|---|---|
| 1,954,755 | Heine | Apr. 10, 1934 |
| 2,146,906 | Moller | Feb. 14, 1939 |
| 2,342,828 | Armitage et al. | Feb. 29, 1944 |
| 2,366,430 | Benton | Jan. 2, 1945 |

FOREIGN PATENTS

| Number | Country | Date |
|---|---|---|
| 559,851 | Great Britain | Mar. 8, 1944 |